(12) United States Patent
Nguyen Dinh Hien et al.

(10) Patent No.: US 12,445,943 B2
(45) Date of Patent: Oct. 14, 2025

(54) METHOD AND DEVICE FOR SELECTING A NODE IN A LOCAL AREA NETWORK

(71) Applicant: SAGEMCOM BROADBAND SAS, Rueil Malmaison (FR)

(72) Inventors: Michaël Thien Bao Nguyen Dinh Hien, Rueil Malmaison (FR); Massinissa Lalam, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 239 days.

(21) Appl. No.: 17/990,061

(22) Filed: Nov. 18, 2022

(65) Prior Publication Data
US 2023/0189014 A1    Jun. 15, 2023

(30) Foreign Application Priority Data

Dec. 15, 2021  (FR) ...................................... 2113572

(51) Int. Cl.
*H04W 16/26*    (2009.01)
*H04W 40/22*    (2009.01)
(Continued)

(52) U.S. Cl.
CPC .......... *H04W 48/16* (2013.01); *H04W 16/26* (2013.01); *H04W 40/22* (2013.01); *H04W 48/10* (2013.01);
(Continued)

(58) Field of Classification Search
CPC ... H04W 8/005–245; H04W 16/02–32; H04W 24/02–10; H04W 28/02–26;
(Continued)

(56) References Cited

U.S. PATENT DOCUMENTS

2020/0029228 A1    1/2020  Zhao et al.
2021/0037451 A1*   2/2021  Morioka ............... H04W 48/16
(Continued)

OTHER PUBLICATIONS

Jul. 8, 2022 Search Report issued in French Patent Application No. 2113572.

*Primary Examiner* — Timothy J Weidner
(74) *Attorney, Agent, or Firm* — Williams Mullen; R. Brian Drozd (57) ABSTRACT

A method and a device for selecting a node in a local area network comprising nodes allowing an extension of wireless communication coverage, the nodes being interconnected by an access point interface of a backhaul subnetwork and a client interface of the backhaul subnetwork of another node, each node of the backhaul subnetwork emitting at least one wireless network called a fronthaul network, to associate itself with the local area network an item of equipment obtains, from each node allowing an extension of wireless communication coverage, information comprising at least one item of information representing the hierarchical level of the node and an item of information indicating whether the client interface of the backhaul subnetwork is connected to an access-point interface of the backhaul subnetwork of a node of a higher hierarchical level, selects, from the information obtained, the node allowing an extension of wireless communication coverage with which the equipment associates itself.

10 Claims, 7 Drawing Sheets

(51) Int. Cl.
*H04W 48/10* (2009.01)
*H04W 48/16* (2009.01)
*H04W 48/18* (2009.01)
*H04W 48/20* (2009.01)
*H04W 84/12* (2009.01)
*H04W 84/18* (2009.01)
*H04W 88/06* (2009.01)
*H04W 88/10* (2009.01)
*H04W 92/02* (2009.01)
*H04W 92/10* (2009.01)
*H04W 92/20* (2009.01)

(52) U.S. Cl.
CPC ........... *H04W 48/18* (2013.01); *H04W 48/20* (2013.01); *H04W 84/12* (2013.01); *H04W 84/18* (2013.01); *H04W 88/06* (2013.01); *H04W 88/10* (2013.01); *H04W 92/02* (2013.01); *H04W 92/10* (2013.01); *H04W 92/20* (2013.01)

(58) Field of Classification Search
CPC ......... H04W 36/0005–385; H04W 40/005–38; H04W 48/02–20; H04W 60/005–06; H04W 72/02–569; H04W 76/10–50; H04W 84/005–22; H04W 88/005–188; H04W 92/02–24
See application file for complete search history.

(56) References Cited

U.S. PATENT DOCUMENTS

2021/0068032 A1    3/2021    Colliaux et al.
2021/0377915 A1    12/2021    Lalam et al.

* cited by examiner

METHOD AND DEVICE FOR SELECTING A NODE IN A LOCAL AREA NETWORK

TECHNICAL FIELD

The present invention relates to a method and a device for selecting a node in a local area network comprising nodes allowing an extension of wireless communication coverage in order to increase the range of the local area network by coordinating a plurality of access points incorporated in the nodes.

PRIOR ART

In local area networks LAN, wireless communication coverage extension systems can be used in order to increase the range of these local area networks LAN by coordinating a plurality of distributed access points AP. These various access points AP are incorporated in communication nodes, simply referred to hereinafter as nodes, interconnected by means of a backhaul subnetwork and all making available one and the same wireless local area network WLAN.

The nodes in the backhaul subnetwork are connected to each other by means of a mesh structure in tree form, a node then being able to serve as a relay between two other nodes in the backhaul subnetwork. The nodes in the backhaul subnetwork are thus interconnected by means of cable connections, for example of the Ethernet type, or with wireless connections. The nodes in the backhaul subnetwork are connected together by a network that is also referred to as a backhaul network that may be either cable or wireless, or a combination of the two.

Each node in the backhaul subnetwork sends at least one wireless network that is referred to as "fronthaul network", to which the stations of the user are connected. This fronthaul network, if it uses Wi-Fi/IEEE 802.11 technology, is the equivalent of what is called BSS (Basic Service Set).

At least one of the nodes of the backhaul subnetwork is connected to a residential gateway that provides access to the internet. The residential gateway may also form part of the backhaul subnetwork.

In the context of the nodes in the backhaul network coupled or not to a residential gateway, the choice of the frequency band serving for the backhaul subnetwork amounted previously to the 2.4 GHz frequency band (limited in terms of speed, highly congested) and to the 5 GHz band permitting. In fact, the 5 GHz band was often privileged for the choice of the backhaul subnetwork. This functionality of backhaul subnetwork is provided by a radio interface, dedicated or not.

Each radio of a node in the backhaul subnetwork has a client part (station) that associates itself with an access point of another node in the backhaul subnetwork. This access point may be dedicated to the functionality of the backhaul network or be the same as the one dedicated to the fronthaul network. Generally, the fronthaul network part of a node in a backhaul subnetwork is operated by a radio that may in its turn serve for the fronthaul network.

At the present time the majority of solutions use only one band for the backhaul subnetwork. This choice obviously forces the channel to be the same for all the radios of the equipment used for the backhaul subnetwork function.

Opening up the 6 GHz band to Wi-Fi technologies henceforth makes it possible to have two frequency bands supporting high-speed transmissions (5 GHz and 6 GHz) and therefore candidates for the backhaul subnetwork function. This makes the choice of the backhaul subnetwork or of the fronthaul network even more complex.

Tree-form topology introduces a latency in the transmission of the data and it is not at the present time possible for a node to be able to choose when a plurality of nodes allowing an extension of coverage are available, a node allowing an extension of wireless communication coverage with which the node is associated before the association with said node.

The present invention proposed makes it possible to optimise the choice of a node in a mesh network for guaranteeing optimum latency in the data transmission.

DISCLOSURE OF THE INVENTION

For this purpose, according to a first aspect, one embodiment of the invention proposes a method for selecting a node in a local area network comprising nodes allowing an extension of wireless communication coverage in order to increase the range of the local area network by coordinating a plurality of access points incorporated in the nodes, the nodes being interconnected by an access-point interface of a backhaul network and a client interface of the backhaul network of another node, each node in the backhaul subnetwork emitting at least one wireless network called fronthaul network, characterised in that the method comprises the steps, performed by an item of equipment for associating itself with the local area network, of:
  obtaining, from each node allowing an extension of wireless communication coverage, information comprising at least one item of information representing the hierarchical level of the node as well as an item of information indicating whether the client interface of the backhaul subnetwork is connected to an access-point interface of the backhaul subnetwork of a node of a higher hierarchical level,
  selecting, from the information obtained, the node allowing an extension of wireless communication coverage with which the equipment associates itself.

One embodiment also relates to a device for selecting a node in a local area network comprising nodes allowing an extension of wireless communication coverage in order to increase the range of the local area network by coordinating a plurality of access points incorporated in the nodes, the nodes being interconnected by an access-point interface of a backhaul subnetwork and a client interface of the backhaul subnetwork of another node, each node in the backhaul network emitting at least one wireless network called fronthaul network, characterised in that the device is included in an item of equipment for associating itself with the local area network, and comprises:
  means for obtaining, from each node allowing an extension of wireless communication coverage, information comprising at least one item of information representing the hierarchical level of the node as well as an item of information indicating whether the client interface of the backhaul subnetwork is connected to an access-point interface of the backhaul subnetwork of a node of a higher hierarchical level,
  means for selecting, from the information obtained, the node allowing an extension of wireless communication coverage with which the equipment is associated.

Thus an item of equipment, before an association, is allowed to be able to choose when a plurality of nodes allowing an extension of coverage are available, the node allowing an extension of wireless communication coverage offering the best performances.

According to a particular embodiment, the equipment associating itself with the local area network is a node that can provide the extension of wireless communication coverage and the node furthermore performs the steps of:

determining, for the node, information comprising at least one item of information representing the hierarchical level of the node as well as an item of information indicating whether the client interface of the backhaul subnetwork is connected to an access-point interface of the backhaul subnetwork of a node of a higher hierarchical level,     sending determined information comprising at least one item of information representing the hierarchical level of the node as well as an item of information indicating whether the client interface of the backhaul subnetwork is connected to an access-point interface of the backhaul network of a node of higher hierarchical level.

According to a particular embodiment, the information is obtained from information included in spontaneous frames and/or in frames responding to a probe.

According to a particular embodiment, the nodes comprise at least two radio interfaces making it possible to communicate on two different channels and the radio interface of a node the client interface of which associates itself with the access-point interface of the radio interface of another node chooses the same channel, for all the access-point interfaces of the radio interface the client interface of which is associated with the access-point interface of the radio interface of the other node, as the channel of the access-point interface of the radio interface of the other node.

According to a particular embodiment, the equipment obtains, from each node allowing an extension of wireless communication coverage, information indicating whether a node of a lower hierarchical level is associated with the access point of the backhaul subnetwork of the node.

According to a particular embodiment, the information representing the hierarchical level is an integer value and, when the node associates itself with a node allowing an extension of wireless communication coverage, the integer value for the node that associates itself is incremented.

According to a particular embodiment, the information representing the hierarchical level is a measurement of the time taken for receiving a response between the node and a node serving as an internet gateway.

According to a particular embodiment, the information representing the hierarchical level is a representation of the total state of occupation of the link between each node allowing an extension of wireless communication coverage and a node serving as an internet gateway.

A particular embodiment also relates to a computer program product. It comprises instructions for implementing, by an item of equipment, the method according to one of the preceding embodiments, when said program is executed by a processor of the equipment.

A particular embodiment also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1A:
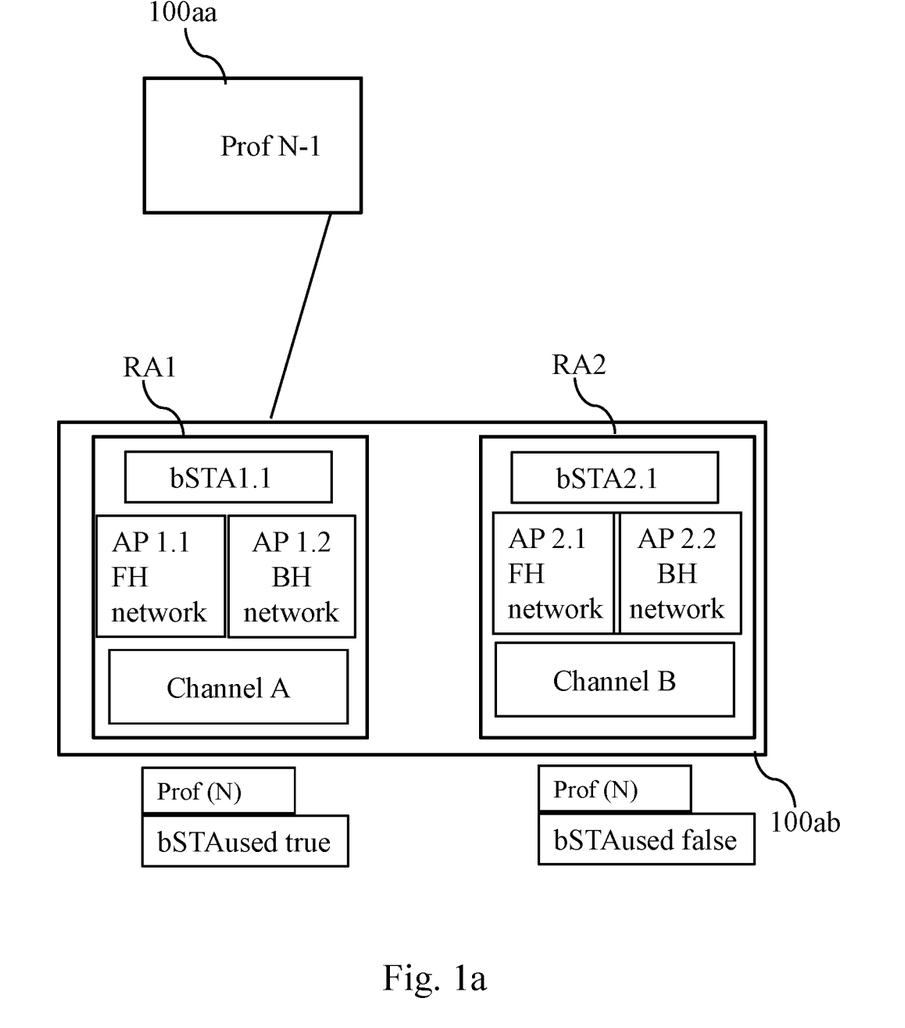
FIG. 1a illustrates schematically a first example of a local area network in one embodiment.

FIG. 1a illustrates schematically a first network in one embodiment.

The mesh local area network is constructed around a backhaul subnetwork comprising a set of interconnected nodes 100aa and 100ab. Each node 100aa and 100ab in the backhaul subnetwork comprises a plurality of radio interfaces:

a radio interface RA1 operating on a first frequency band, for example the 5 GHz frequency band,     a radio interface RA2 operating on a second frequency band, for example the 6 GHz frequency band.

The first radio interface RA1 comprises:

a client interface bSTA1.1 of the backhaul subnetwork, an access-point interface AP1.2 of the backhaul subnetwork, the access-point interface AP1.2 being dedicated to the association of the client interface of another node in the backhaul network (network BH),     optionally an access-point interface AP1.1 corresponding to an access-point interface of the user local area network, this interface being dedicated to the association of stations or terminals (fronthaul network),     a radio channel denoted A for sending and receiving in the frequency band of the radio RA1.

The second radio interface RA2 comprises:

a client interface bSTA2.1 of the backhaul subnetwork, an access-point interface AP2.2 of the backhaul subnetwork, the access-point interface AP2.2 being dedicated to the association of the client interface of another node in the backhaul network (network BH),     optionally an access-point interface AP2.1 corresponding to an access-point interface of the user local area network, this interface being dedicated to the association of stations or terminals (fronthaul network),     a radio channel denoted B for sending and receiving in the frequency band of the radio RA2.

Hereinafter the term "node" should be understood to mean an item of equipment offering connectivity capabilities and forming the mesh local area network.

Hereinafter the term "station" should be understood to mean a fixed or movable item of equipment using the resources of the mesh local area network by means of the nodes of said local area network. A station is for example a wireless mobile terminal or a wireless speaker.

In various examples, the equipment, nodes or stations are respectively each compatible with one or more standards in the IEEE 802.11 family of standards.

A radio can host a plurality of access-point interfaces, each access-point interface AP having its own connection parameters (e.g. an access-point interface for a private network, a public network, a video network, etc.).

So that the network is stable, if a client interface bSTA of the backhaul network associates itself with an access-point interface operating on a given channel of the backhaul network, all the access points hosted by the radio interface hosting the client interface bSTA of the backhaul network will adopt the same given channel for sending and receiving.

According to one embodiment, when each node 100 spontaneously broadcasts a beacon frame in a so-called passive mode (for example every 0.1 seconds approximately), it inserts in the beacon frame at least one information element comprising an item of information representing the hierarchical level of the node within the network.

The information representing the hierarchical level is for example an integer value, for example the value zero for a node serving as an internet gateway, i.e. directly connected to the internet, and which represents the origin of the backhaul network. The integer value is incremented by each node of a lower hierarchy level. The information representing the hierarchy level thus represents the number of nodes separating the node from the internet connection.

Figure 1B:
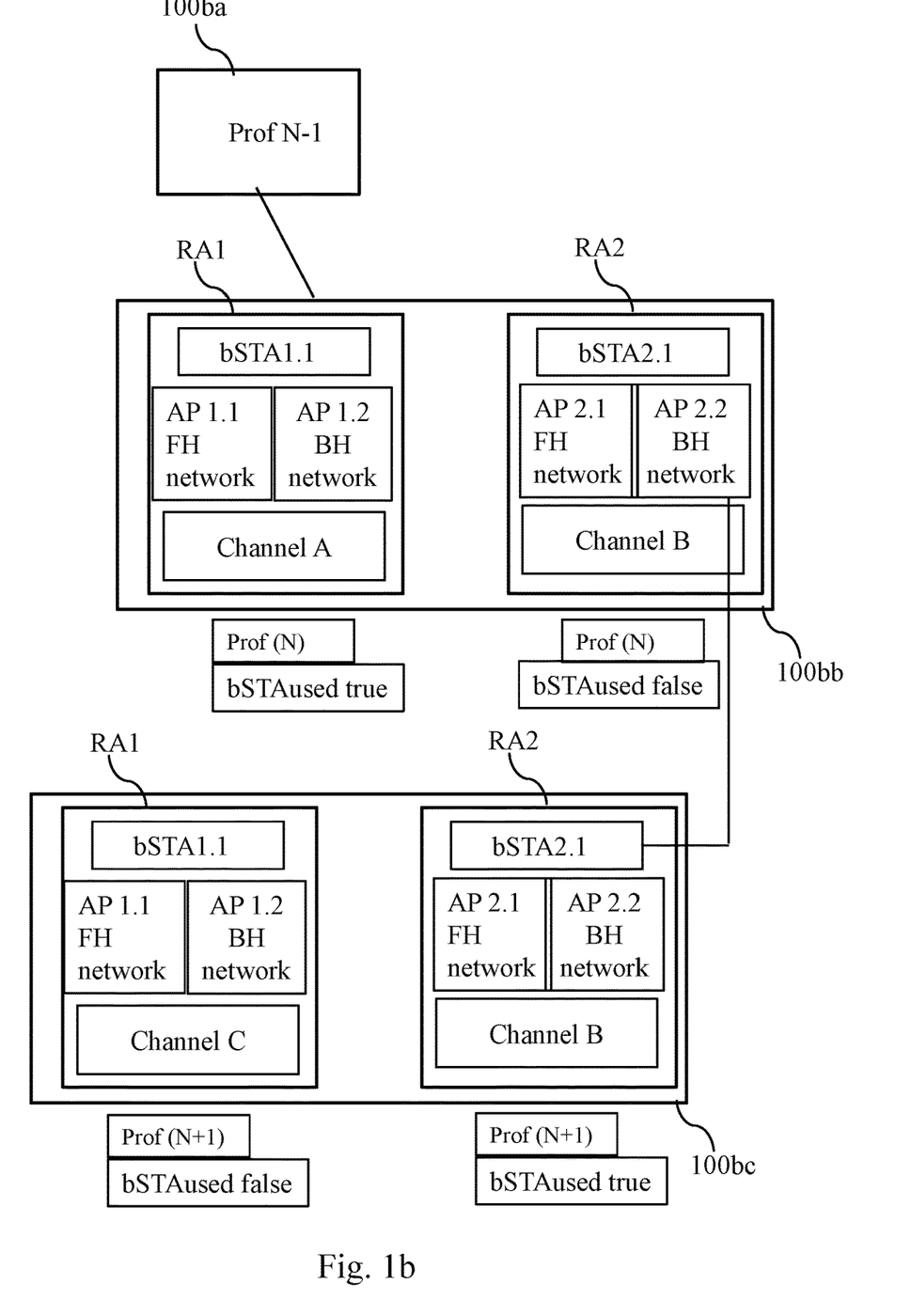
FIG. 1b illustrates schematically a second example of a local area network in one embodiment.

Each time a client interface bSTA1.1 or bSTA2.1 of the backhaul network associates itself with an access-point interface AP1.2 or AP2.2 of the backhaul network the hierarchical rank of which is N, for example Prof(N) in FIG. 1a, all the access points hosted by the node hosting the client interface bSTA1.1 or bSTA2.1 will have the hierarchical rank N+1, for example Prof(N+1) in FIG. 1b, and will broadcast it in their turn.

The information representing the hierarchical level is for example obtained from a ping command implemented by each node. The information representing the hierarchical level is a measurement of the time taken for receiving a response, referred to as round trip time RTT, between the node and the node serving as a gateway, i.e. directly connected to the internet and which represents the origin of the backhaul network.

The information representing the hierarchical level is for example a representation of the total occupation level between the node and the node serving as internet gateway. The occupation level is calculated for the node serving as internet gateway and having a repercussion on each connection with a node of lower rank in the tree architecture. The occupation level of the radio interface is the combination of the activity time (sending and receiving radio frames) with respect to the total time.

Thus the lower the value of the information representing the hierarchical level, the higher the hierarchical level.

It should be noted here that the various examples of information representing the hierarchical level can be combined partially or totally to represent the information representing the hierarchical level.

In a so-called active scan mode, when an item of equipment such as a node or a station wishes to discover its radio environment, such as for example the surrounding access points, the node sends a probe request asking what network is available on this channel. Each node in the network present on this channel responds to this probe request by a probe response comprising at least the information representing the hierarchical level of the node within the network.

The information element furthermore comprises information indicating whether the client interface of the backhaul subnetwork is connected to an access-point interface of the backhaul subnetwork of another node.

For example, the information is set to the value true if the client interface bSTA1.2 or bSTA2.1 of the backhaul subnetwork hosted by the radio interface RA1 or RA2 is connected to an access-point interface AP1.1 or AP2.2 of the backhaul subnetwork of a node of hierarchical level N−1, or set to false otherwise.

Thus, in the example of FIG. 1a, the node 100ab having its client interface bSTA1.1 connected to an access-point interface of the backhaul subnetwork of the node 100aa, sends, on the channel A, spontaneous beacon frames and/or frames responding to a probe comprising at least the information representing the hierarchical level of the node as well as the information denoted bSTAused set to the value true.

The information representing the hierarchical level is for example equal to the rank N.

The node 100ab not having its client interface bSTA2.1 connected to an access-point interface of the backhaul subnetwork of another node sends, on the channel B, spontaneous frames and/or frames responding to a probe comprising at least the information representing the hierarchical level of the node, for example N, as well as the information denoted bSTAused set to the value false.

The information representing the hierarchical level of the node and the information denoted bSTAused are for example inserted as a new information element (IE) in these frames.

Each new node or station that seeks an access point with which to associate may, before association, select the optimum access point in the topology of the network. Each new node or station can also decide whether the propagation conditions (for example on the basis of an indicator of the received power (received signal strength indicator (RSSI)) between the various possible access points are equivalent, and privilege a radio interface not serving for the backhaul subnetwork.

The stations are for example smartphones or a tablet, a computer, a television, a network storage unit NAS ("Network Attached Storage").

FIG. 1b illustrates schematically a second example of a local network in one embodiment.

The local network is constructed around a backhaul subnetwork comprising a set of interconnected nodes 100ba and 100bb and a new node 100bc.

The nodes 100ba and 100bb of the backhaul subnetwork are identical to the nodes 100aa and 100ab of FIG. 1a.

The access points hosted by the node 100bb have a hierarchical level N and the access points hosted by the node 100ba have the hierarchical level N−1. The information representing the hierarchical level of the node 100bb is for example N or an RTT value equal to 15 ms or an occupation level of 25%.

Thus, in the example of FIG. 1b, the node 100bb having its client interface bSTA1.1 connected to an access-point interface of the backhaul subnetwork of the node 100ba, sends, on the channel A, spontaneous frames and/or probe response frames comprising at least the information representing the hierarchical level as well as the information denoted bSTAused set to the value true.

The node 100bb not having its client interface of the backhaul subnetwork bSTA2.1 connected to an access-point interface of another node of the backhaul subnetwork sends, on the channel B, spontaneous frames and/or probe response frames comprising at least the information representing the hierarchical level of the node as well as the information denoted bSTAused set to the value false.

The information representing the hierarchical level and the information denoted bSTAused are for example inserted as a new information element (IE) in these frames.

In the example of FIG. 1b, the node 100bc chooses to associate its client interface bSTA2.1 with the access-point interface AP2.2 of the backhaul subnetwork the hierarchical level of which is N in order not to encumber the channel A since the radio interface RA1 uses the channel A for the backhaul network and for the fronthaul network.

With the information representing the hierarchical level, for example inserted as a new information element, the access points hosted by the node 100bc determine their hierarchical level N+1.

The node 100bc having its client interface of the backhaul subnetwork bSTA2.1 connected to the access-point interface AP2.2 of the backhaul subnetwork of the node 100bb will send, on the channel B identical to the one used by the radio interface RA2 hosting the client interface AP2.2 of the node 100bb, spontaneous frames and/or probe response frames comprising at least the information representing the hierarchical level of the node as well as the information denoted bSTAused set to the value true.

The node 100bc not having its client interface of the backhaul network bSTA1.1 connected to an access-point interface of the backhaul subnetwork of another node (node 100ba or 100bb) will send, in a channel denoted C, which may be different from the channel A used by the node 100bb, spontaneous frames and/or probe response frames comprising at least the information representing the hierarchical level of the node as well as the information denoted bSTAused set to the value false.

The information representing the hierarchical level is for example N+1. The information representing the hierarchical level is for example an RTT value equal to 25 ms or an occupation level of 35%.

The information representing the hierarchical level of the node and the information denoted bSTAused are for example inserted as a new information element (IE) in these frames.

It should be noted that the possibility of being able to diversify the channels used on the various radio interfaces makes it possible to use the medium with fewer collisions. Thus, knowing the radio interfaces connected via their client interface bSTA of the backhaul subnetwork makes it possible to explicitly force the use of another channel for the ratio interface RA1 of the node 100bc. It is thus possible to optimise the use of the medium more effectively with respect to the neighbouring equipment without necessarily connecting thereto or having to coordinate directly.

Figure 1C:
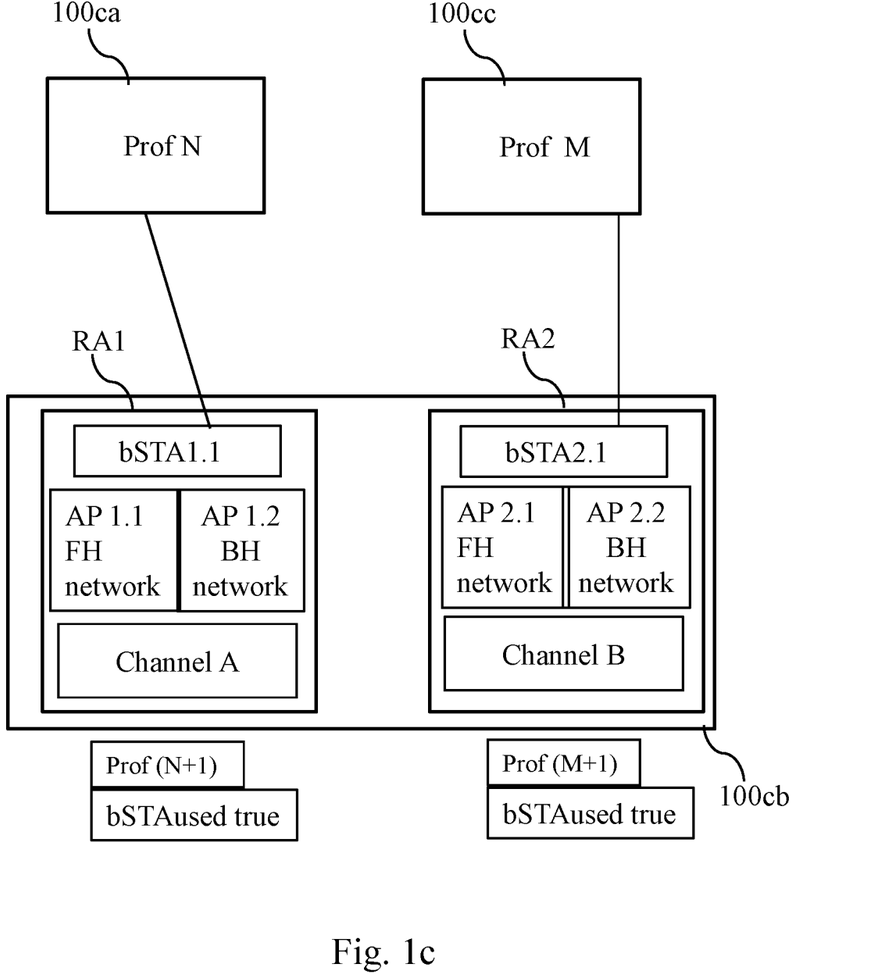
FIG. 1c illustrates schematically a third example of a local area network in one embodiment.

FIG. 1c illustrates schematically a third example of a local area network in one embodiment.

The local area network is constructed around a backhaul subnetwork comprising a set of interconnected nodes 100ca, 100cb and 100cc.

In the example of FIG. 1c, the client interface of the backhaul subnetwork bSTA1.1 of the node 100cb is connected to an access-point interface of the backhaul subnetwork of the node 100ca and the client interface of the backhaul subnetwork bSTA2.1 of the node 100cb is connected to an access-point interface of the backhaul subnetwork of the node 100cc.

The access points hosted by the node 100ca have the hierarchical rank N and the access points hosted by the node 100cc have the hierarchical rank M.

With the information obtained by the nodes 100ca and 100cc, the access points hosted by the radio interface RA1 of the node 100cb thus determine the hierarchical rank N+1 and the access points hosted by the radio interface RA2 of the node 100cb thus determine the hierarchical rank M+1.

Thus, in the example of FIG. 1c, the node 100cb having its client interface of the backhaul subnetwork bSTA1.1 connected to an access-point interface of the backhaul subnetwork of the node 100ca sends, on the channel A, spontaneous frames and/or probe response frames comprising at least the information representing the hierarchical level of the radio RA1 of the node 100cb as well as the information denoted bSTAused set to the value true.

The node 100cb having its client interface of the backhaul subnetwork bSTA2.1 connected to an access-point interface of the backhaul subnetwork of the node 100cc sends, on the channel B, spontaneous frames and/or probe response frames comprising at least the information representing the hierarchical level of the radio RA2 of the node 100cb as well as the information denoted bSTAused set to the value true.

The information representing the hierarchical level of the radio of the node and the information denoted bSTAused are for example inserted as a new information element (IE) in these frames.

Figure 1D:
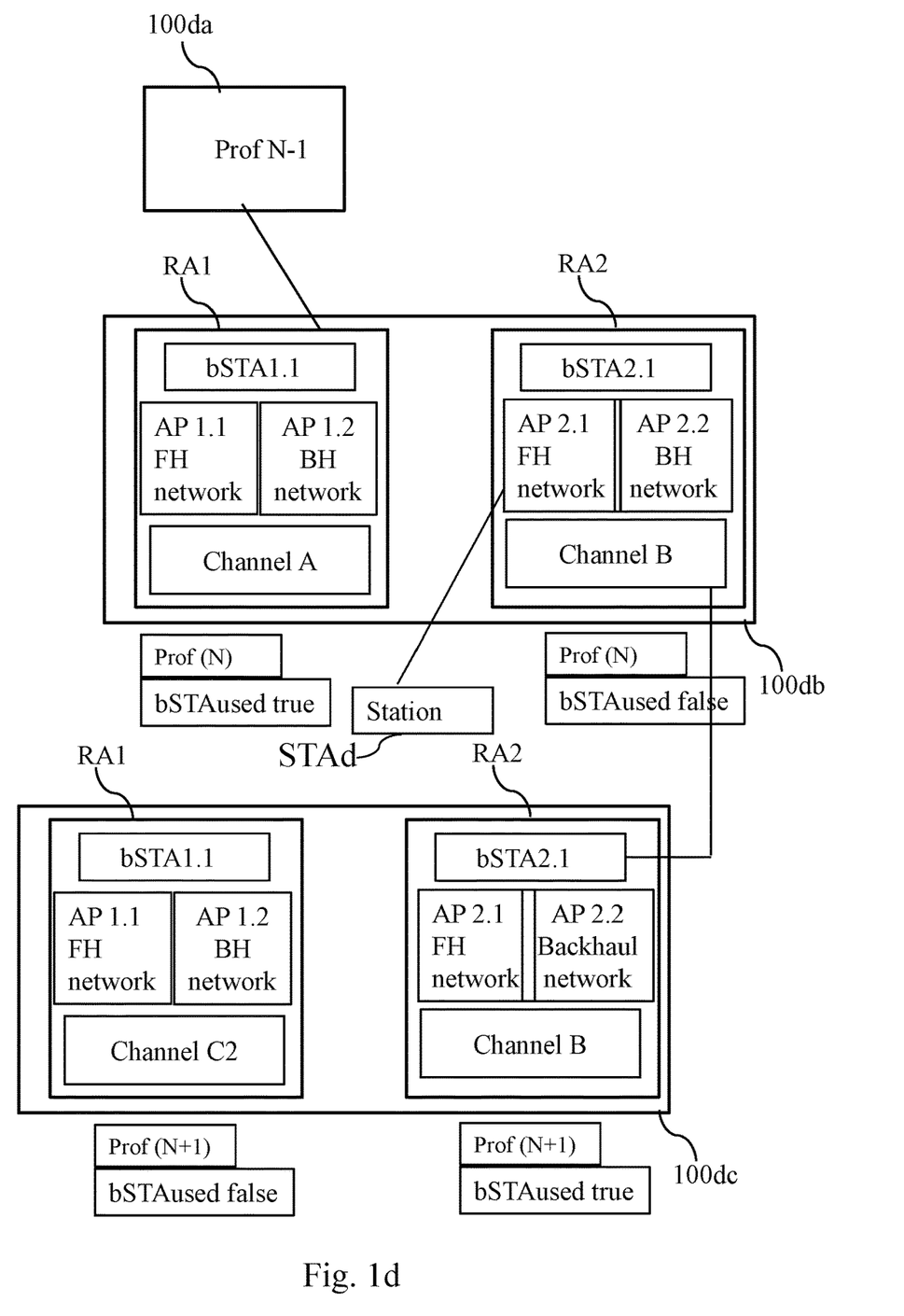
FIG. 1d illustrates schematically a fourth example of a local area network in one embodiment.

FIG. 1d illustrates schematically a fourth example of a local area network in one embodiment.

The local area network is constructed around a backhaul subnetwork comprising the set of nodes 100da, 100db and 100dc.

The nodes 100da, 100db and 100dc of the backhaul subnetwork are identical to the nodes 100ba, 100bb and 100bc of FIG. 1b.

The access points hosted by the node 100db have the hierarchical rank N and the access points hosted by the node 100da have the hierarchical rank N−1.

Thus, in the example of FIG. 1d, the node 100db having its client interface of the backhaul subnetwork bSTA1.1 connected to a client interface of the backhaul subnetwork of the node 100da sends, on the channel A, spontaneous frames and/or probe response frames comprising at least the information representing the hierarchical level of the node as well as the information denoted bSTAused set to the value true.

The node 100db not having its client interface of the backhaul subnetwork bSTA2.1 connected to an access point interface of another node of the backhaul subnetwork sends, on the channel B, spontaneous frames and/or probe response frames comprising at least the information representing the hierarchical level of the node as well as the information denoted bSTAused set to the value false.

The information representing the hierarchical of the node and the information denoted bSTAused is for example inserted as a new information element (IE) in these frames.

The information representing the hierarchical level of the node 100db is for example the rank N or an RTT value equal to 15 ms or an occupation level of 25%.

The node 100dc has its client interface of the backhaul subnetwork bSTA2.1 associated with the access-point interface AP2.2 of the backhaul subnetwork the hierarchical rank of which is N in order not to encumber the channel A.

The access points hosted by the node 100dc have the hierarchical rank N+1.

The node 100dc having its client interface of the backhaul subnetwork bSTA2.1 connected to the access-point interface AP2.2 of the backhaul subnetwork of the node 100db sends, on the channel B identical to the one used by the radio interface RA2 hosting the client interface AP2.2, spontaneous frames and/or probe response frames comprising at least the information representing the hierarchical level of the node as well as the information denoted bSTAused set to the value true.

The node 100*dc* not having its client interface of the backhaul subnetwork bSTA1.1 connected to an access-point interface of the backhaul subnetwork of another node (node 100*da* or 100*db*) broadcasts, in a channel denoted C, which may be different from the channel A used by the node 100*db*, spontaneous frames and/or probe response frames comprising at least the information representing the hierarchical level of the node as well as the information denoted bSTAused set to the value false.

The information representing the hierarchical level of the node 100*dc* is for example the rank N+1. The information representing the hierarchical level is for example an RTT value equal to 25 ms or an occupation level of 35%.

The information representing the hierarchical level of the node and the information denoted bSTAused is for example inserted in frames as a new information element (IE).

If a station STAd wishes to associate itself with the fronthaul network, the station STAd is able to determine, before association, the type of use of each radio in each node using the new information elements. According to the type of traffic, the station STAd privileges a fronthaul access point hosted by a radio having the best hierarchical level and the backhaul-subnetwork access point of which is not used.

The best hierarchical level is for example the smallest integer value, the smallest RTT value or the small occupation level.

In the example of FIG. 1*d*, the station STAd selects the fronthaul access point AP2.1 of the radio interface RA2 of the node 100*db*.

Figure 1E:
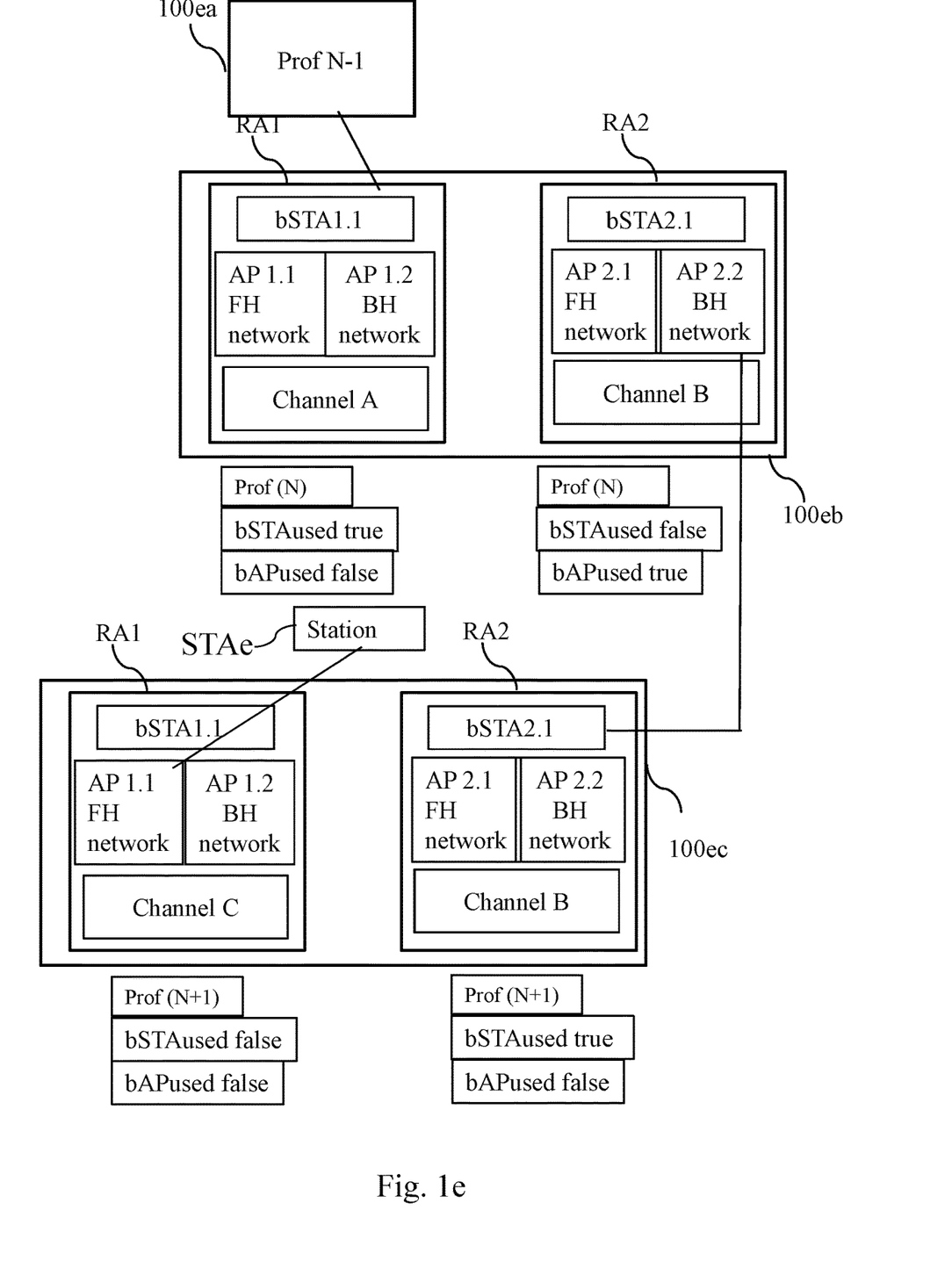
FIG. 1e illustrates schematically a fifth example of a local area network in one embodiment.

FIG. 1*e* illustrates schematically a fifth example of a local area network in one embodiment.

The local area network is constructed around a backhaul subnetwork comprising a set of nodes 100*ea*, 100*eb* and 100*ec*.

The nodes 100*ea*, 100*eb* and 100*ec* of the backhaul subnetwork are identical to the nodes 100*da*, 100*db* and 100*dc* of FIG. 1*d*.

The access points hosted by the node 100*eb* have the hierarchical rank N and the access points hosted by the node 100*ea* have the hierarchical rank N−1.

According to the example of FIG. 1*d*, each node furthermore broadcasts, for each radio interface RA1, RA2, information denoted bAPused that indicates whether at least one node with a lower hierarchical level is associated with the access point of the backhaul subnetwork via its client interface bSTA.

Thus, in the example of FIG. 1*e*, the node 100*eb* having its client interface of the backhaul subnetwork bSTA1.1 connected to an access-point interface of the backhaul subnetwork of the node 100*ea* and not having any client interface of the backhaul subnetwork of another node connected to its access-point interface of the backhaul subnetwork AP1.1 sends, on the channel A, spontaneous frames and/or probe response frames comprising at least the information representing the hierarchical level of the node, the information denoted bSTAused set to the value true and the information bAPused to the value false.

The node 100*eb* not having its client interface of the backhaul subnetwork bSTA2.1 connected to an access-point interface of the backhaul subnetwork of the node 100*ea* and having the client interface of the backhaul subnetwork of the node 100*ec* connected to its access-point interface of the backhaul subnetwork AP2.2 sends, on the channel B, spontaneous frames and/or probe response frames comprising at least the information representing the hierarchical level of the node, the information denoted bSTAused set to the value false and the information bAPused to the value true.

The information representing the hierarchical level is for example the rank N. The information representing the hierarchical level is for example an RTT value equal to 15 ms or an occupation level of 25%.

The access points hosted by the node 100*ec* have the hierarchical rank N+1.

The node 100*ec* having its client interface of the backhaul subnetwork bSTA2.1 connected to the access-point interface of the backhaul subnetwork AP2.2 of the node 100*eb* and not having any client interface of another node connected to its access-point interface of the backhaul subnetwork AP2.2 sends, on the channel B identical to the one used by the radio interface RA2 hosting the client interface AP2.2 of the backhaul subnetwork, spontaneous frames and/or probe response frames comprising at least the information representing the hierarchical level of the node, the information denoted bSTAused set to the value true and the information bAPused to the value false.

The node 100*ec* not having its client interface of the backhaul subnetwork bSTA1.1 connected to an access-point interface of the backhaul subnetwork of another node (node 100*da* or 100*db*) and not having any client interface of another node connected to its access-point interface of the backhaul subnetwork AP1.2 broadcasts, in a channel denoted C, which may be different from the channel A used by the node 100*eb*, spontaneous frames and/or probe response frames comprising at least the information representing the hierarchical level of the node, the information denoted bSTAused set to the value false and the information bAPused to the value false.

The information representing the hierarchical level is for example N+1. The information representing the hierarchical level is for example an RTT value equal to 25 ms or an occupation level of 35%.

If a station STAe wishes to associate itself, the station is able to determine before association the type of use of each radio of each node and chooses to associate itself with the access point AP1.1 of the radio interface RA1 of the node 100*ec* since the two items of information with regard to the use of said radio RA1 for functions related to the backhaul subnetwork are at the value false.

Figure 2:
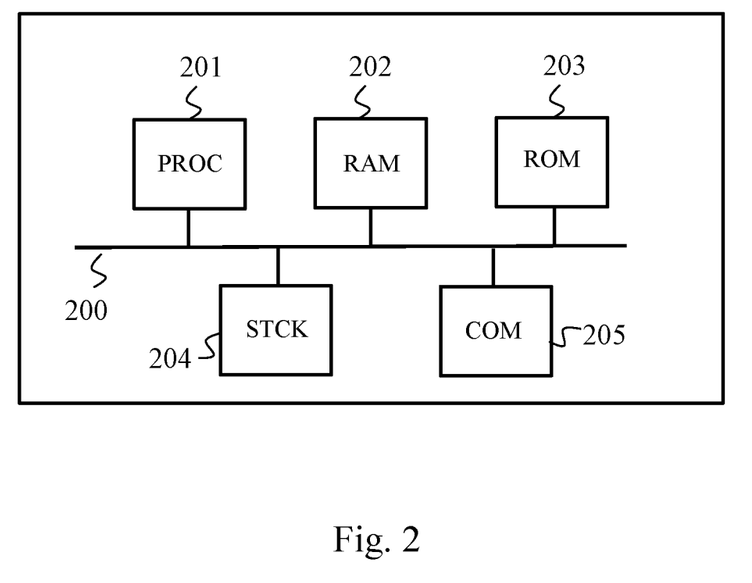
FIG. 2 illustrates schematically the architecture of a node according to one embodiment.

FIG. 2 illustrates schematically the architecture of a node according to one embodiment.

According to the example of hardware architecture shown in FIG. 2, each node 100 (100*aa*, 100*ab*, 100*ba*, 100*bb*, 100*bc*, 100*ca*, 100*cb*, 100*cc*, 100*da*, 100*db*, 100*dc*, 100*ea*, 100*eb*, 100*ec*) then comprises, connected by a communication bus 200: a processor or CPU (central processing unit) 201; a random access memory RAM 202; a read only memory ROM 203; a storage unit such as a hard disk (or storage medium reader, such as an SD (Secure Digital) card reader 204; at least one communication interface 205 enabling the node to communicate with the equipment of the local area network.

The processor 201 is capable of executing instructions loaded in the RAM 202 from the ROM 203, from an external memory (not shown), from a storage medium (such as an SD card) or from a communication network. When the node is powered up, the processor 201 is capable of reading instructions from the RAM 202 and executing them. These instructions form a computer program causing the implementation, by the processor 201, of all or part of the method described in relation to FIG. 3.

The method described below in relation to FIG. 3 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the node comprises electronic circuitry configured for implementing the methods described in relation to FIG. 3.

Figure 3:
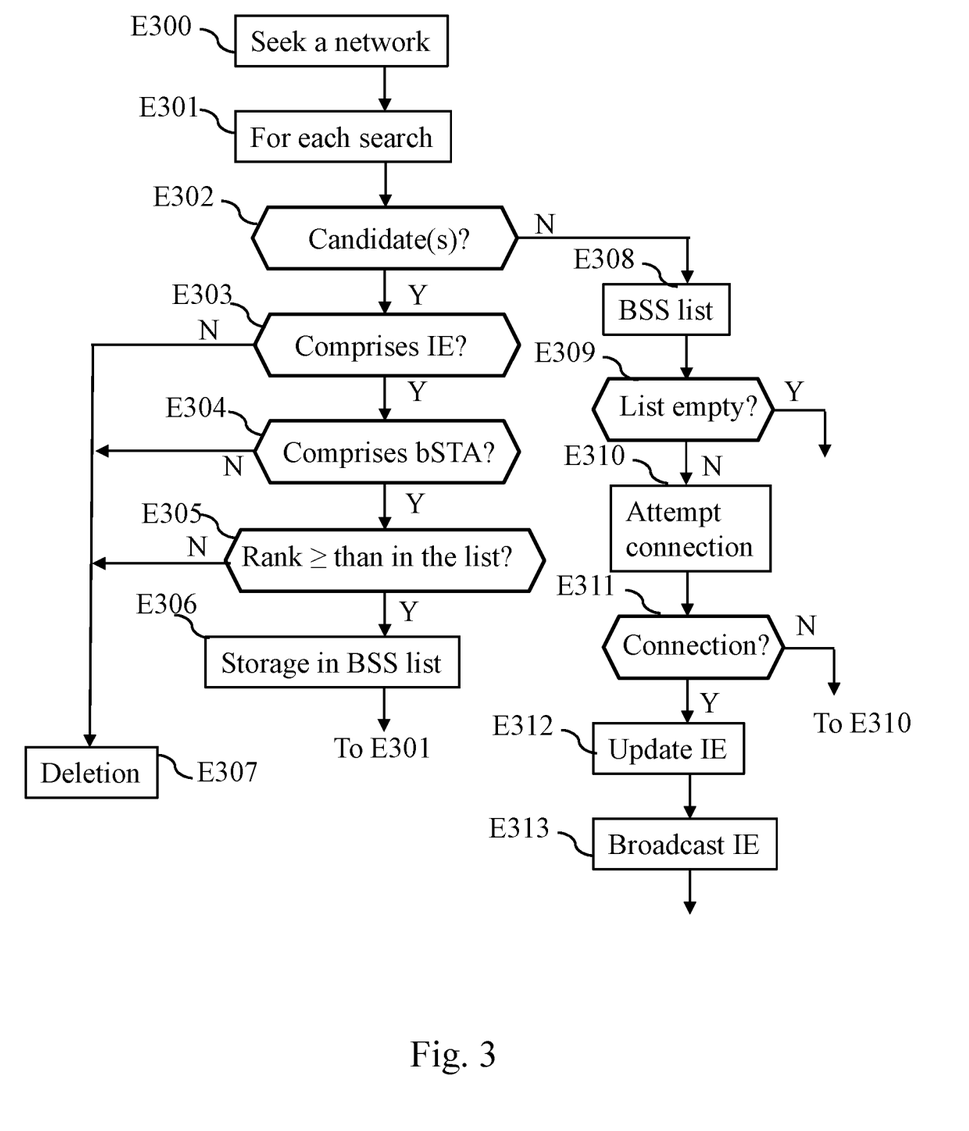
FIG. 3 illustrates an example of a method implemented according to one embodiment.

FIG. 3 illustrates an example of a method executed according to one embodiment.

The present algorithm is executed by an item of equipment such as for example a node or a station. The present algorithm will be described in an example wherein it is executed by a node.

At the step E300, the node 100 triggers a procedure of searching for a wireless local area network to connect thereto.

Each node 100 of the wireless network spontaneously sends, in a so-called passive mode (for example every 0.1 seconds approximately), a spontaneous frame wherein an information element is inserted comprising information representing the hierarchical level of the node in the network and information indicating whether the access-point interface of the backhaul subnetwork is connected to a client interface of the backhaul subnetwork of a node of a higher hierarchical level.

In a so-called active scanning mode, when the node wishes to discover a wireless network, the node sends a probe request frame asking which network is available on this channel. Each node of the network that receives the probe request frame responds with a probe response frame comprising at least the information representing the hierarchical level of the node in the network and information indicating whether the access-point interface of the backhaul subnetwork is connected to a client interface of the backhaul subnetwork of a node of a higher hierarchical level.

At the step E301, the node stores each spontaneous frame received and/or each probe response frame received. The nodes that sent the frames are considered to be candidate nodes.

At the step E302, the node checks whether a spontaneous frame received and/or each probe response frame received sent by a candidate node has not been analysed and if so selects it and passes to the step E303. If not the node passes to the step E308.

At the step E303, the node checks whether the spontaneous frame or the probe response frame comprises an information element according to an embodiment.

The information element comprises at least the information representing the hierarchical level of the node that sent the spontaneous frame or the probe response frame. In the affirmative, the node passes to the step E304.

If the spontaneous frame or the probe response frame does not comprise the information element according to one embodiment, the node passes to the step E307.

At the step E307, the node deletes the spontaneous frame or the probe response frame.

At the step E304, the node checks whether the information element furthermore comprises an item of information indicating whether the client interface of the backhaul subnetwork of the node that sent the spontaneous frame or the probe response frame is connected to an access-point interface of the backhaul subnetwork of a node of a higher hierarchical level.

If so, the node passes to the step E305. If not, the node passes to the step E307.

At the step E305, the node checks whether the information representing the hierarchical level of the node that sent the spontaneous frame or the probe response frame has a hierarchical level higher than or equal to information representing the hierarchical level of a node that sent the spontaneous frame or the probe response frame and stored in a list of potential access points (BSS list) of the local area network.

A hierarchical level higher than or equal to another hierarchical level is a hierarchical level where the value of the information representing the hierarchical level has a value lower than or equal to the other hierarchical level.

In the affirmative, the node passes to the step E306. In the negative, the node passes to the step E307.

For example, the node 100ec has information representing the hierarchical level of hierarchical rank N+1 or has information representing the hierarchical level equal to the RTT value of 25 ms or has an occupation level of 35%, and the node 100eb, previously stored in the list of potential access points of the local area network, has information representing the hierarchical level equal to N or has information representing the hierarchical level equal to the RTT value of 15 ms or has an occupation level of 25%.

The node identifies the node 100eb as having a hierarchical level higher than or equal to the node 100ec and passes to the step E307.

At the step E306, the node stores, in the list of potential access points (list BBS) of the local area network, the information included in the spontaneous frame or the probe response frame selected.

Once this operation has been performed, the node returns to the step E301.

At the step E308, the node selects the list of potential access points of the local area network.

At the step E309, the node checks whether the list of potential access points of the local area network is empty. If so, the node interrupts the present algorithm. If not, the node passes to the step E310.

At the step E310, the node selects a node in the list of potential access points and demands an attempt at connection with the node in the list of potential access points selected.

At the step E311, the node checks whether the connection with the node is established. If not, the node selects another node in the list of potential access points of the local area network and returns to the step E310. If so, the node passes to the step E312.

At the step E312, when the peripheral is a node, the node updates the information representing its hierarchical level and the information indicating whether the access-point interface of the backhaul subnetwork is connected to a client interface of the backhaul subnetwork of a node of a higher hierarchical level.

At the step E313, when the peripheral is a node, the node sends spontaneous and/or probe response frames comprising at least the information representing the hierarchical level of the node as well as the information indicating whether the client interface of the backhaul subnetwork is connected to an access-point interface of the backhaul subnetwork of a node of a higher hierarchical level.

The invention claimed is:

1. A method for selecting a node in a local area network comprising nodes allowing an extension of wireless communication coverage in order to increase the range of the local area network by coordinating a plurality of access points incorporated in the nodes, the nodes being interconnected by an access-point interface of a backhaul subnetwork and a client interface of the backhaul subnetwork of another node, each node in the backhaul subnetwork emitting at least one wireless network called fronthaul network, the nodes comprise at least two radio interfaces making it possible to communicate on two different channels, wherein the method causing an item of equipment for associating itself with the local area network to perform,     obtaining, from each node allowing an extension of wireless communication coverage, and for each radio interface of the at least two radio interfaces, information comprising at least one item of information representing a hierarchical level of the node as well as an item of information indicating whether a client interface of a radio interface of the node of the backhaul subnetwork is connected to an access-point interface of the backhaul subnetwork of a node of a higher hierarchical level,     selecting, from the information obtained and from the nodes allowing an extension of coverage for which the information comprising at least one item of information representing the hierarchical level of the node and the information indicating whether the client interface of the radio interface of the node of the backhaul subnetwork is connected to an access-point interface of the backhaul subnetwork of a node of a higher hierarchical level has been obtained, the node allowing an extension of wireless communication coverage with which the equipment associates itself.

2. The method according to claim 1, wherein the equipment associating itself with the local area network is a node that can provide the extension of wireless communication coverage, and wherein the equipment that is a node furthermore performs:

determining, for the node, information comprising at least one item of information representing the hierarchical level of the node as well as an item of information indicating whether the client interface of the backhaul subnetwork is connected to an access-point interface of the backhaul subnetwork of a node of a higher hierarchical level,     sending determined information comprising at least one item of information representing the hierarchical level of the node as well as an item of information indicating whether the client interface of the backhaul subnetwork is connected to an access-point interface of the backhaul subnetwork of a node of higher hierarchical level.

3. The method according to claim 1, wherein the information is obtained from information included in spontaneous frames and/or in frames responding to a probe.

4. The method according to claim 1, wherein the radio interface of a node whose client interface is associated with the access-point interface of the radio interface of another node chooses the same channel, for all the access-point interfaces of the radio interface whose client interface associated with the access-point interface of the radio interface of the other node, as the channel of the access-point interface of the radio interface of the other node.

5. The method according to claim 4, wherein the equipment obtains, from each node allowing an extension of wireless communication coverage, information indicating whether a node of a lower hierarchical level is associated with the access point of the backhaul subnetwork of the node.

6. The method according to claim 1, wherein the information representing the hierarchical level is an integer value and, when the node associates itself with a node allowing an extension of wireless communication coverage, the integer value for the node that associates itself is incremented.

7. The method according to claim 1, wherein the information representing the hierarchical level is a measurement of the time taken for receiving a response between the node and a node serving as an internet gateway.

8. The method according to claim 1, wherein the information representing the hierarchical level is a representation of the total state of occupation of the link between each node allowing an extension of wireless communication coverage and a node serving as an internet gateway.

9. A non-transitory storage medium wherein a computer program comprising instructions for implementing, by an item of equipment, the method according to claim 1, when said program is executed by a processor of the equipment.

10. A device for selecting a node in a local area network comprising nodes allowing an extension of wireless communication coverage in order to increase the range of the local area network by coordinating a plurality of access points incorporated in the nodes, the nodes being interconnected by an access-point interface of a backhaul subnetwork and a client interface of the backhaul subnetwork of another node, each node in the backhaul subnetwork emitting at least one wireless network called fronthaul network, the nodes comprise at least two radio interfaces making communications possible on two different channels wherein in that the device is included in an item of equipment for associating itself with the local area network, and comprises electronic circuitry configured for:

obtaining, from each node allowing an extension of wireless communication coverage, and for each radio interface of the at least two radio interfaces information comprising at least one item of information representing a hierarchical level of the node as well as an item of information indicating whether the client interface of the backhaul subnetwork is connected to an access-point interface of the backhaul subnetwork of a node of a higher hierarchical level,     selecting, from the information obtained and from the nodes allowing an extension of coverage for which the information comprising at least one item of information representing the hierarchical level of the node and the information indicating whether the client interface of the radio interface of the node of the backhaul subnetwork is connected to an access-point interface of the backhaul subnetwork of a node of a higher hierarchical level has been obtained, the node allowing an extension of wireless communication coverage with which the equipment is associated.

\* \* \* \* \*